US012657029B2

(12) United States Patent
Strong

(10) Patent No.: US 12,657,029 B2
(45) Date of Patent: Jun. 16, 2026

(54) FLUSH-ON-DEMAND PROCESSOR INSTRUCTION TRACE

(71) Applicant: Rivos Inc., Mountain View, CA (US)

(72) Inventor: Beeman Connally Strong, Portland, OR (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 18/456,649

(22) Filed: Aug. 28, 2023

(65) Prior Publication Data

US 2024/0078115 A1 Mar. 7, 2024

Related U.S. Application Data

(60) Provisional application No. 63/374,874, filed on Sep. 7, 2022.

(51) Int. Cl.
*G06F 9/38* (2018.01)
*G06F 9/30* (2018.01)
*G06F 11/362* (2025.01)

(52) U.S. Cl.
CPC .......... *G06F 9/3808* (2013.01); *G06F 9/3005* (2013.01); *G06F 11/3636* (2013.01)

(58) Field of Classification Search
CPC .. G06F 9/30189; G06F 9/3808; G06F 9/3005; G06F 11/3636; G06F 11/3027; G06F 11/364; G06F 13/14
See application file for complete search history.

(56) References Cited

U.S. PATENT DOCUMENTS

| | | | | |
|---|---|---|---|---|
| 7,627,784 B1* | 12/2009 | Allen | ................... | G06F 11/3656 |
| | | | | 714/30 |
| 8,250,542 B1* | 8/2012 | Ball | .................... | G06F 11/3636 |
| | | | | 717/124 |
| 9,047,400 B2* | 6/2015 | Scott | ................... | G06F 11/3495 |
| 10,216,616 B2 | 2/2019 | Strong et al. | | |

(Continued)

OTHER PUBLICATIONS

"Specification of RISC-V Trace Control Interface", Aug. 15, RISC-V International , pp. 1-37 (Year: 2022).*

(Continued)

*Primary Examiner* — Courtney P Spann
(74) *Attorney, Agent, or Firm* — Brake Hughes Bellermann LLP

(57) ABSTRACT

In a general aspect, a processor can include an instruction processing unit configured to execute a plurality of machine-readable instructions of a program in accordance with a control flow of the program and, in response to completing execution of respective instructions of the machine-readable instructions, produce respective instruction retirement information. The processor can also include a selectively enablable trace encoder that is configured, when enabled, to receive the respective instruction retirement information, and encode the instruction retirement information in an instruction trace corresponding with the control flow. The processor can also include a circular buffer that is configured to, when the trace encoder is enabled, receive and store the instruction trace, and, in response to a flush, communicate the stored instruction trace via a memory interface, where the memory interface is selectively enabled in response to the flush request.

23 Claims, 6 Drawing Sheets

100

(56)  References Cited

U.S. PATENT DOCUMENTS

| | | | |
|---|---|---|---|
| 2010/0257510 A1* | 10/2010 | Horley ............... | G06F 11/3636 |
| | | | 717/128 |
| 2016/0011893 A1* | 1/2016 | Strong ............... | G06F 9/45558 |
| | | | 718/1 |
| 2018/0054374 A1* | 2/2018 | Chen ....................... | H04L 43/04 |
| 2019/0179642 A1* | 6/2019 | Gibbs ................. | G06F 11/3471 |
| 2022/0308878 A1* | 9/2022 | Ableidinger .......... | G06F 9/3808 |
| 2024/0338277 A1* | 10/2024 | Ableidinger ........ | G06F 9/30036 |

OTHER PUBLICATIONS

Gajinder Panesar, Iain Robertson, "Efficient Trace for RISC-V Version 2.0_rc1", Apr. 5, 1-103 (Year: 2022).*
"MVS Programming: Authorized Assembler Services Guide", Jun. 21, International Business Machines Corporation, pp. 85-119 (Year: 2021).*
G. Panesar et al.: "Efficient Trace for RISC-V Version 1.1.3-Frozen 20e81ce9d2f0f0bb323f518981b397c33a42a0a5," Nov. 2, 2021, 116 pages.

* cited by examiner

400

ENABLE INSTRUCTION TRACE IN FLUSH-ON-DEMAND MODE OF OPERATION — 405

EXECUTE INSTRUCTIONS AND PROVIDE RETIREMENT INFORMATION — 410

PRODUCE INSTRUCTION TRACE (E.G., ENCODED AND COMPRESSED) — 415

STORE INSTRUCTION TRACE IN CIRCULAR BUFFER (E.G., WITH WRAPPING/WRITE OVER) — 420

DISABLE INSTRUCTION TRACE — 425

FLUSH STORED INSTRUCTION TRACE TO MEMORY (E.G, CACHE MEMORY, SYSTEM MEMORY, ETC.) — 430

FLUSH-ON-DEMAND PROCESSOR INSTRUCTION TRACE

CROSS-REFERENCE TO RELATED APPLICATION

This application claims benefit, under 35 U.S.C. § 119, of U.S. Provisional Patent Application No. 63/374,874, filed on Sep. 7, 2022, entitled "FLUSH-ON-DEMAND PROCESSOR INSTRUCTION TRACE," the disclosure of which is incorporated by reference herein in its entirety.

TECHNICAL FIELD

This description relates to computer processing apparatuses, such as microprocessors, processors, central processing units, and the like. More specifically, this disclosure relates to computer processing apparatuses, and associated systems and methods for tracing instruction processing to identify control flow changes when executing a program.

BACKGROUND

Analyzing performance and operation of processors and related systems, including execution of programs (e.g., software) on such processors and systems, is often carried out to understand, improve, and/or debug that performance and operation. For instance, processors, such as RISC-V®, processors, x86 processors, ARM® processors, Power® processors, etc., can include circuitry that is used to collect information on control flow changes taken when executing a program. This control flow change information can be used to debug software and/or hardware, as well as to inform modifications for improving execution performance of the program. For instance, such control flow change information can be used in combination with an instruction profile of the program, as well as using the executable code, assembly code and/or source code of the program of interest for improving performance. In implementations, an instruction profile can include a statistical distribution of execution frequency of instructions within the program being analyzed. That is, control flow change information, in combination with a corresponding instruction profile and a corresponding program, in one or more forms, can be used to identify performance issues in the program and, as a result, can facilitate making performance improvements.

Current approaches for obtaining such control flow change information can have certain drawbacks. For instance, in some implementations, system registers, e.g., upwards of one-hundred system registers, can be used for storing control flow change information. However, implementing such registers in a processor (e.g., on a semiconductor die) increases semiconductor area utilized to implement the corresponding processor. Additionally, processing overhead for obtaining, or retrieving, control flow change information from these system registers can be in the range of one-thousand to one-hundred-thousand processor cycles, e.g., ten to one-hundred processor cycles per register. In other implementations, memory bandwidth is used to flush (store) control change information to memory during execution of a program, and this use of memory bandwidth can result in performance impacts, such as by interfering with memory loads and stores of a program being analyzed.

SUMMARY

In a general aspect, a processor includes an instruction processing unit that is configured to execute a plurality of machine-readable instructions of a program in accordance with a control flow of the program and, in response to completing execution of respective instructions of the plurality of machine-readable instructions, produce respective instruction retirement information. The processor further includes a selectively enabled trace encoder that, when enabled, is configured to receive the respective instruction retirement information, and encode the respective instruction retirement information in an instruction trace in correspondence with the control flow of the program. The processor further includes a circular buffer that is configured, when the trace encoder is enabled, to receive and store the instruction trace and, in response to receiving a flush request, communicate the stored instruction trace via a memory interface, where the memory interface is selectively enable in response to the flush request.

Implementations can include one or more of the following aspect or features, alone or in combination. For example, the processor can further include a configuration register operatively coupled with at least one of the trace encoder or the memory interface. The configuration register can include at least one configuration bit configured to selectively enable and disable the trace encoder, and to selectively enable and disable the memory interface.

The at least one configuration bit can include a configuration bit that can have a first logic value or a second logic value. The processor can be configured, when the configuration bit has the first logic value, to enable the trace encoder and disable the memory interface. When the configuration bit has the second logic value, the processor can be configured to disable the trace encoder and enable the memory interface.

The at least one configuration bit can include a first configuration bit to selectively enable and disable the trace encoder, and a second configuration bit to selectively enable and disable the memory interface.

The respective instruction retirement information can include at least one of a program counter value, an indication of an instruction type, or an indication of an instruction result.

The trace encoder can be configured, when encoding the instruction trace, to periodically communicate synchronization packet(s) to the circular buffer for storage in the circular buffer. A synchronization packet of the synchronization packets can include a respective program counter value indicating a starting executable instruction address for encoded instruction trace subsequent to the synchronization packet.

Periodically communicating synchronization packets can include periodically communicating synchronization packets such that a first synchronization packet is stored at a beginning of the circular buffer, and a second synchronization packet is stored at mid-point of the circular buffer.

Periodically communicating synchronization packets can include periodically communicating synchronization packets such that the circular buffer, when filled with trace information, includes two or more sync packets.

Periodically communicating synchronization packets can include periodically communicating synchronization packets based on a number of instruction trace packets provided to the circular buffer by the trace encoder.

Periodically communicating synchronization packets can include periodically communicating synchronization packets based on a number of instructions encoded in the instruction trace since communication of a previous synchronization packet.

A size of the circular buffer can be based on a number of instructions to be encoded in the instruction trace after a corresponding synchronization packet.

Storing the instruction trace can include, when an end of the circular buffer is reached, overwriting previously stored instruction trace starting at a beginning of the circular buffer.

Encoding the respective instruction retirement information in the instruction trace can include encoding, in the instruction trace, instruction retirement information for non-sequential machine-readable instructions, and instruction retirement information for conditionally non-sequential machine-readable instructions. Encoding the respective instruction retirement information in the instruction trace can exclude encoding instruction retirement information for sequential machine-readable instructions from the instruction trace.

Encoded instruction information for a conditionally non-sequential instruction can include a single bit indicating whether or a not a branch in the control flow of the program was taken.

In another general aspect, a system include a processor having an instruction processing unit configured to execute a plurality of machine-readable instructions of a program in accordance with a control flow of the program. The processor, in response to completing execution of respective instructions of the plurality of machine-readable instructions, produces respective instruction retirement information. The system further includes a selectively enablable trace encoder that, when enabled, is configured to receive the respective instruction retirement information, and encode the respective instruction retirement information in an instruction trace in correspondence with the control flow of the program. The system also includes a circular buffer that is configured to, when the trace encoder is enabled, receive and store the instruction trace and, in response to a flush request, communicate the stored instruction trace via a memory interface. The memory interface is disabled when the trace encoder is enabled. The system still further includes memory operationally coupled with the memory interface. The memory is configured to receive and save the stored instruction trace. The system also includes a decoder configured to, based on the plurality of machine-readable instructions of the program and the stored instruction trace, reconstruct the control flow of the program.

Implementations can include one or more of the following aspects or features, alone or in combination. For example, the circular buffer can be implemented using one of an array of digital-logic gates, a cache memory of the processor, or a static-random-access memory of the processor.

The decoder can be implemented on a computing system operationally coupled with the memory to obtain the stored instruction trace. The computing system can have the plurality of machine-readable instructions of the program stored therein, or have access to the plurality of machine-readable instructions of the program via a communication interface.

In another general aspect, a method for operating a processor includes, in response to receiving, by the processor, a request to enable an instruction trace mode of operation, disabling a memory interface configured to communicate an instruction trace produced by a trace encoder to memory, and executing, by an instruction processing unit of the processor, a plurality of machine-readable instructions of a program in accordance with a control flow of the program. The method further includes in response to completing execution of respective instructions of the plurality of machine-readable instructions, producing, by the instruction processing unit, respective instruction retirement information. The method also includes receiving, by the trace encoder, the respective instruction retirement information, and encoding, by the trace encoder, the respective instruction retirement information in the instruction trace in correspondence with the control flow of the program. The method still further includes receiving and storing, by a circular buffer, the instruction trace, and, in response to receiving, by the processor, a request to flush the stored instruction trace enabling the memory interface, and communicating the stored instruction trace to the memory via the memory interface.

Implementations can include one or more of the following features or aspects, along or in combination. For example, the method can include, when encoding the instruction trace, periodically communicating synchronization packets to, and for storage in, the circular buffer. A synchronization packet of the synchronization packets can include a respective program counter value indicating a starting executable instruction address for instruction trace subsequent to the synchronization packet.

Periodically communicating synchronization packets can include periodically communicating synchronization packets such that a first synchronization packet is stored at a beginning of the circular buffer, and a second synchronization packet is stored at mid-point of the circular buffer.

Storing the instruction trace can include, when an end of the circular buffer is reached, overwriting previously stored instruction trace starting at a beginning of the circular buffer.

Encoding the respective instruction retirement information in the instruction trace can include encoding, in the instruction trace, instruction retirement information for non-sequential machine-readable instructions, and instruction retirement information for conditionally non-sequential machine-readable instructions. Encoding the respective instruction retirement information in the instruction trace can exclude encoding instruction retirement information for sequential machine-readable instructions from the instruction trace.

Encoded instruction information for a conditionally non-sequential instruction can include a single bit indicating whether or a not a branch in the control flow of the program was taken.

BRIEF DESCRIPTION OF THE DRAWINGS

Like reference symbols in the various drawings indicate like and/or similar elements.

DETAILED DESCRIPTION

Figure 1:
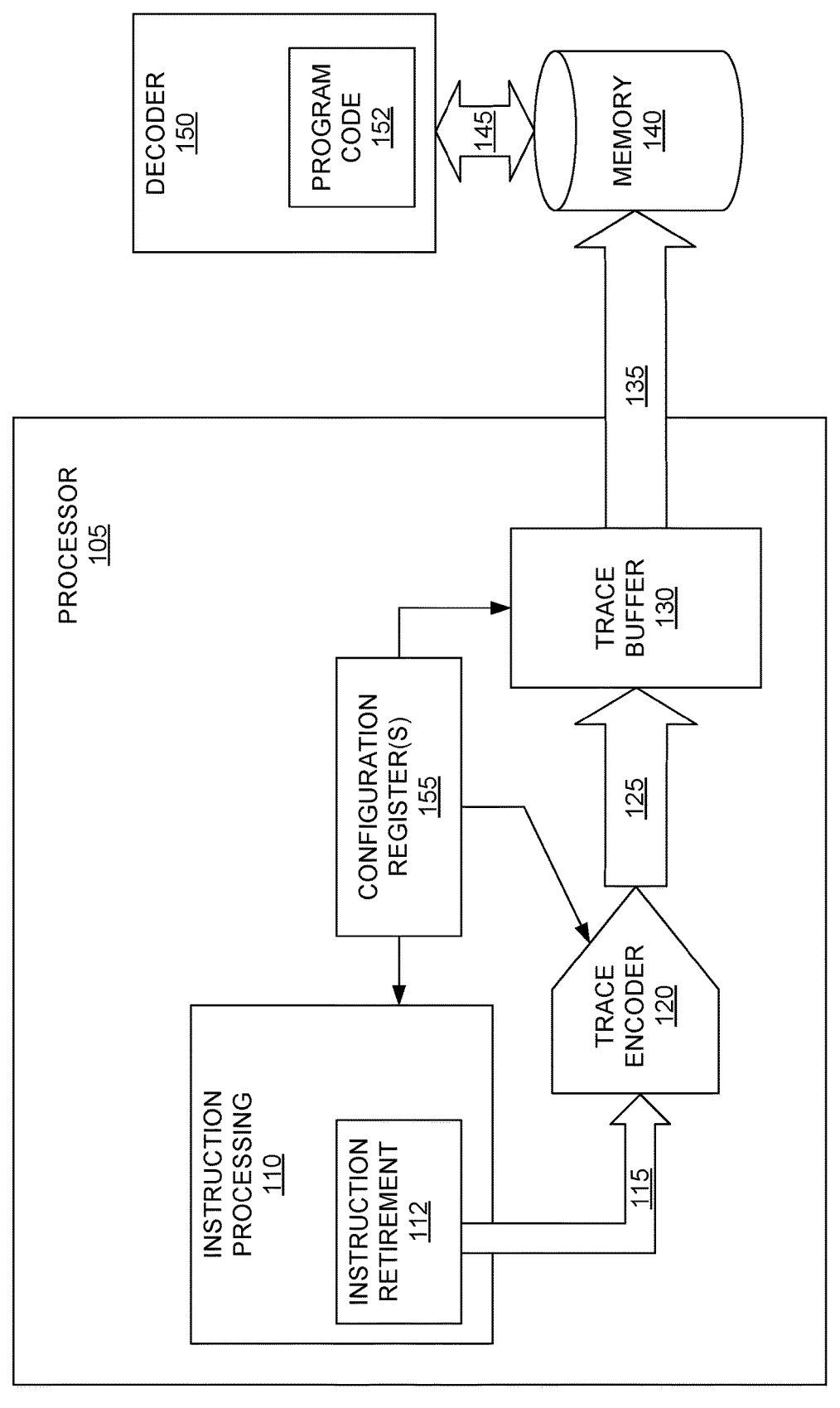
FIG. 1 is a block diagram illustrating a system including a processor that implements an instruction trace flush-on-demand mode of operation.

This disclosure relates to computer processing apparatuses, such as processors, microprocessors, central processing units, graphics processing units, tensor processing units, and accelerators, etc. (hereafter "processor(s)"), and related systems and methods, which can overcome at least some of the drawbacks of prior approaches for obtaining information regarding control flow changes that occur when executing a program on a processor. In the described implementations, a compressed and encoded instruction trace can be produced by a trace encoder. This instruction trace, e.g., in the form of packets, is then written to an internal storage buffer in a circular manner without storing the instruction trace out to memory (e.g., system memory, cache memory, external memory, etc.) while the trace encoder is enabled and while the trace encoder is producing the instruction trace. In disclosed implementations, when an end, or bottom, of the storage buffer is reached while storing the instruction trace, writing of the storage buffer wraps to the beginning, or top, of the storage buffer, and previous trace information included in the storage buffer is overwritten.

In example implementations, synchronization packets (sync packets) also can be included in the storage buffer, e.g., as part of the instruction trace, where the sync packets provide a starting instruction address for subsequently stored packets of the instruction trace corresponding with the control flow of retired (completed) instructions. In some implementations, at least two sync packets can be included in the storage buffer, so that at least a portion, e.g., half or more, of the instruction trace contained in the storage buffer includes useful information, e.g., can be referenced to a corresponding sync packet, when storing of the instruction trace in the storage buffer wraps from the end (bottom) of the storage buffer to the beginning (top) of the storage buffer.

In example implementations, when a request to obtain the instruction trace from the storage buffer is received, e.g., by writing one or more bits of a configuration register, the trace encoder can be disabled, or stopped. The instruction trace information in the storage buffer can then be stored, or flushed, out to memory of a system in which the processor is operating, e.g., by enabling a memory interface that operationally couples the storage buffer with the memory to which the instruction trace is being flushed to. In implementations described herein, such an approach can be referred to as instruction trace flush-on-demand (FOD), FOD mode, FOD instruction trace, a FOD operation mode, an instruction trace FOD mode of operation, etc.

Such approaches can overcome at least some of the drawbacks of current approaches noted above. For instance, in some implementations, the storage (circular) buffer can be implemented utilizing significantly less semiconductor die area than system registers used for collecting instruction trace information, which can include on the order of 500 bytes of register storage, while instruction trace with a FOD mode of operation can be implemented using 80 bytes, or less, for tracing an equivalent amount of instructions. Accordingly, the area savings can be at least up to 80 percent, as compared to prior approaches.

Additionally, the performance impact of reading such system registers, as compared to flushing an instruction trace storage buffer to memory, can be reduced. Further, the described approaches can reduce the performance impact associated with memory bandwidth usage of prior approaches, as memory bandwidth is not utilized when an instruction trace is being generated, or is only utilized when a request to flush stored instruction trace information is received. The usage of memory bandwidth to flush an instruction trace from the storage buffer, when requested, can be significantly less than an amount of memory bandwidth utilized to continually flush instruction trace information to memory while the instruction trace is being generated. The amount of reduction of memory bandwidth utilization can depend on a number of factors, such as a size of the internal buffer, the frequency of requests to flush instruction trace information to memory, memory bandwidth, and/or architecture of a particular implementation, and so forth.

FIG. 1 is a block diagram illustrating a system 100 including a processor 105 that implements an instruction trace FOD mode of operation. In example implementations, the processor 105, can be a microprocessor in accordance with a number of different architectures, such as RISC-V®, x86, ARM®, Power®, etc. In the example of FIG. 1, for instance, the processor 105 includes an instruction processing unit 110, a trace encoder 120, a trace buffer 130, and a configuration register 155. The configuration register 155 can be implemented using one or more registers, such as system registers or general purpose registers. As shown in FIG. 1, the system 100 also includes a memory 140 that can be configured to receive instruction trace information, e.g., from the trace buffer 130, such as in the approaches described herein. While the memory 140 in FIG. 1 is shown as being external to the processor 105, in some implementations the memory 140 can be included in the processor 105. For instance, the memory 140 can be cache memory of the processor 105, a static-random-access memory included in the processor 105, etc. In other implementations, the memory 140 can be external to, and operationally coupled with the processor 105, such as dynamic-random-access memory, a solid-state drive, a hard-disk drive, cloud storage, etc. The system 100 further includes a decoder 150, that can be configured to reconstruct the control flow of the executed program, e.g., from the instruction trace and program code 152.

The instruction processing unit 110 of the processor 105 can be configured to execute a plurality of machine-readable instructions of a program according to a control flow of the program during its execution by the processor 105. In response to completing execution of respective instructions of the plurality of machine-readable instructions, an instruction retirement unit 112 of the system 100 can produce respective instruction retirement information. Such instruction retirement information can include a program counter value of a completed (retired) instruction, an indication of an instruction type of the completed instruction, and/or an indication of a result of the instruction, e.g., whether a conditional branch was taken. Instruction types can vary based on the particular architecture and can include conditional branches, unconditional branches (e.g., jump or call instructions), instructions associated with an interrupt routine, instructions associated with an exception handling routine, etc.

In response to a request that the processor 105 enter an instruction trace FOD mode of operation, e.g., by writing one or more corresponding bits of the configuration register 155, the processor 105 can be configured to enable the trace encoder 120 and to disable a memory interface 135 that operationally couples the trace buffer 130 with the memory 140. The trace encoder 120, when enabled, can be configured to receive the respective instruction retirement information from the instruction retirement unit 112 via an interface 115 and to encode the respective instruction retirement information in an instruction trace in correspondence with the control flow of the program being executed by the processor 105. In example implementations, the instruction trace (instruction trace information) can be included in encapsulated packets that are communicated from the trace encoder 120 to the trace buffer 130 via an interface 125. The trace buffer 130 can be implemented using an array of digital-logic gates, a static-random-access memory, cache memory, etc.

In some implementations, the instruction trace information can be an encoded and compressed record of control flow, such as taken or not taken branches or other control flow changes, when executing the corresponding program. For instance, the instruction trace can include information regarding instructions that result in, or that can result in, changes in the control flow of the program. For instance, information for conditional branch instructions, jump instructions, instructions for handling interrupts, and/or instruction for handling exceptions can be included in the instruction trace. Resulting changes in the control flow of the executing program can be referred to as program counter (or instruction pointer) deltas (or deltas). Such deltas can be non-sequential changes in control flow, where program code execution is not in sequential program counter order. In some implementations, information for sequentially executed instructions (sequential program counter increases), other than conditional instructions where a branch is not taken, can be excluded from the instruction trace information.

In example implementations, the encoded and compressed instruction trace can include, for a conditional branch where a destination address (program counter value) for the branch, and the associated delta can be inferred from the program code 152, a single bit indicating whether or not the branch was taken. For executed (retired) instructions, other than conditional branch instructions, which result in a delta, such as jump instructions, where the delta can be inferred from the program code 152, the encoded and compressed instruction trace can exclude any trace information. For instructions that result in control flow deltas that cannot be inferred from the program code 152, such as un-inferable jumps, instructions associated with interrupt handling, and/or instructions associated with exception handling, the encoded and compressed program trace can include a program counter value (address) after occurrence of the delta, e.g., the first instruction after the delta.

In this example, the encoded and compressed instruction trace, once flushed out to the memory 140, can be accessed by the decoder 150 via an interface 145, which can be a network interface, or other data communication interface, such as a system data bus. The decoder 150 can also have access to the program code 152 of the executed program (e.g., machine code, assembly code, and/or source code). For instance, the program code 152 can be stored in the decoder 150, or otherwise accessible to the decoder 150. In this example, the decoder 150 can be configured to reconstruct control flow associated with execution of the program using the instruction trace information and the program code 152. In the system 100, the trace buffer 130, which can operate as a circular or ring buffer, can be configured to receive and store the instruction trace information produced by the trace encoder 120, e.g., when the trace encoder 120 is enabled. As described herein, once a complete buffer of trace information has been stored in the trace buffer 130, e.g., the trace buffer 130 is full, writing of trace information the trace buffer 130 can wrap to a beginning of the trace buffer 130. After wrapping, previously stored trace information can be overwritten, with the oldest trace information being overwritten first. In some implementations, the trace encoder 120 and the trace buffer 130 can be configured to continually generate and accumulate trace information, e.g., the trace encoder 120 is not selectively enabled or disabled based on one or more configuration register bits.

When it is desired to obtain trace information from the trace buffer 130, a flush request can be sent to the processor, such as by writing one or more corresponding bits of the configuration register 155, or a via a flush request message that is provided to the trace buffer 130 and/or the trace encoder 120. In response to this flush request, the memory interface 135 can be enabled, and the trace information stored in the trace buffer 130 can be flushed (flushed-on-demand) to the memory 140 via the memory interface 135. Depending on the particular implementation, the trace encoder 120 can either be disabled in response to the flush request, or can remain enabled in other implementations. The decoder 150 can be configured to determine which portions of the flushed trace information are usable, or valid, based on sync packets included in the trace information obtained, such as in conjunction with the program code 152.

In some implementations, the configuration register 155 can include a single configuration bit for controlling instruction trace FOD operation. For instance, when the single configuration bit has a first value, the trace encoder 120 can be enabled and the memory interface 135 can be disabled, and trace information can be collected. When the single configuration bit has a second logic value, opposite the first logic value, the trace encoder 120 can be disabled and the memory interface 135 can be enabled, and trace information stored in the trace buffer 130 can be flushed out to, and saved in, the memory 140.

In other implementations, the configuration register 155 can include multiple configuration bits for controlling instruction trace FOD operation. For instance, the configuration register 155 can include a trace encoder enable bit for selectively enabling the trace encoder 120 and a FOD configuration bit. In this example, if the trace encoder enable configuration bit and FOD configuration bit are both set to logic 1, trace information can accumulate in the trace buffer 130, e.g., with wrapping when an end of the trace buffer 130 is reached, and once the trace encoder enable bit is cleared (e.g., is set to logic 0), or a flush request is received, trace information stored in the trace buffer 130 is flushed to the memory 140. Further in this example, if the trace encoder enable bit is set to logic 1 and the FOD configuration bit is set to logic 0, trace information can continually streams out of the trace buffer 130 to the memory 140, and when the trace encoder enable bit is cleared, e.g., set to logic 0, any remaining trace information, e.g., not previously flushed to the memory 140, can be flushed to the memory 140. In another implementation, a first configuration bit can be used to selectively enable and disable the trace encoder 120, while a second configuration bit can be used to selectively enable and disable the memory interface 135, e.g., to flush stored trace information on demand.

In still other implementations, the processor 105 can be configured to implement a FOD mode of operation without the use of configuration register bits. For instance, the trace encoder 120, the trace buffer 130 and/or the memory interface 135 can be configured to implement a FOD mode of operation in response to one or more request messages, such as a request message to operate in the FOD mode of operation and/or a request message to flush stored trace information from the trace buffer 130 to the memory 140. In this example, the request to enter the FOD mode of operation can result in trace information being accumulated in the trace buffer 130 with the memory interface 135 being disabled, while the request to flush stored trace information can result in the memory interface 135 being enabled, stored trace information being flushed from the trace buffer 130 to the memory 140, and, after the stored trace information is flushed, the memory interface 135 again being disabled.

In some implementations of the example of FIG. 1, the trace encoder 120 can be configured, when enabled and encoding an instruction trace, to periodically communicate synchronization packets to the trace buffer 130 for storage along with packets including control flow information. For instance, a synchronization packet can include a respective program counter value indicating a starting executable instruction address for encoded instruction trace information for instructions that retire (complete execution) subsequent to the synchronization packet. In such implementations, the decoder 150 can associate packets including information for traced instructions with their respective sync packet when reconstructing (analyzing) control flow changes associated with execution of the corresponding program.

As discussed herein, the trace encoder 120 can be configured to communicate sync packets such that a first synchronization packet is stored at a beginning of the trace buffer 130, and a second synchronization packet is stored at a mid-point of the trace buffer 130. Such an approach can be used to ensure that at least half of the instruction trace information in the trace buffer 130, when full, includes usable information (e.g., has a corresponding sync packet). In other implementations, the trace encoder 120 can be configured to periodically communicate sync packets to the trace buffer 130 based on a number of instruction trace packets (packets including information on traced control flow of the program) provided to the trace buffer 130. In still other implementations, the trace encoder 120 can be configured to periodically communicate sync packets to the trace buffer 130 based on a number of instructions encoded in the instruction trace since communication of a previous synchronization packet. In some implementations, other numbers of sync packets can be used, e.g., one sync packet or three or more sync packets. A size of the circular buffer can be based on a number of instructions to be encoded in the instruction trace after a corresponding synchronization packet, or on a size of encapsulated trace information packets, as well as on other factors that can vary based on the specific implementation.

Figure 2A:
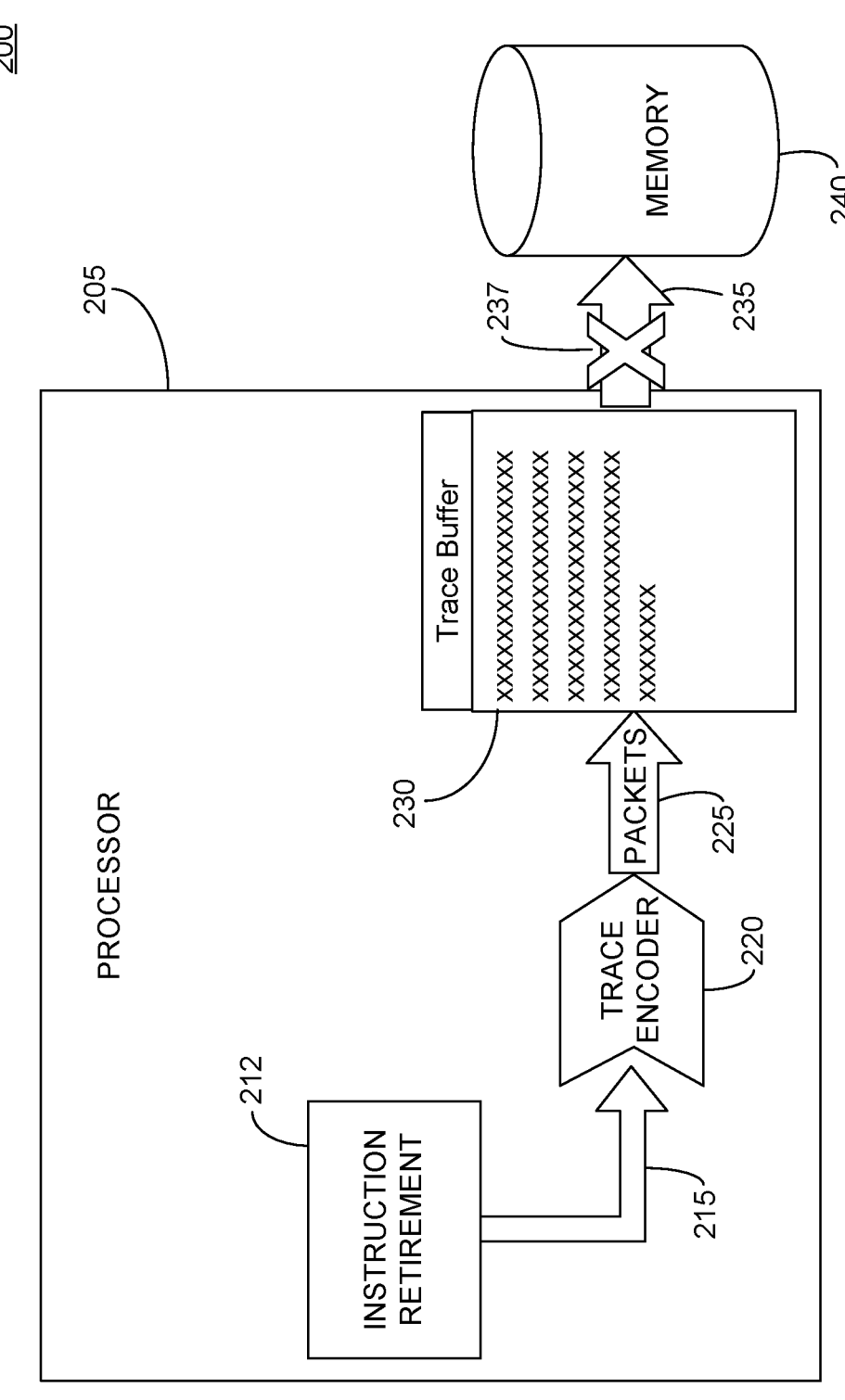
FIG. 2A to 2C are diagrams schematically illustrating operation of a processor in a system implementing an instruction trace flush-on-demand mode of operation.
Figure 2B:
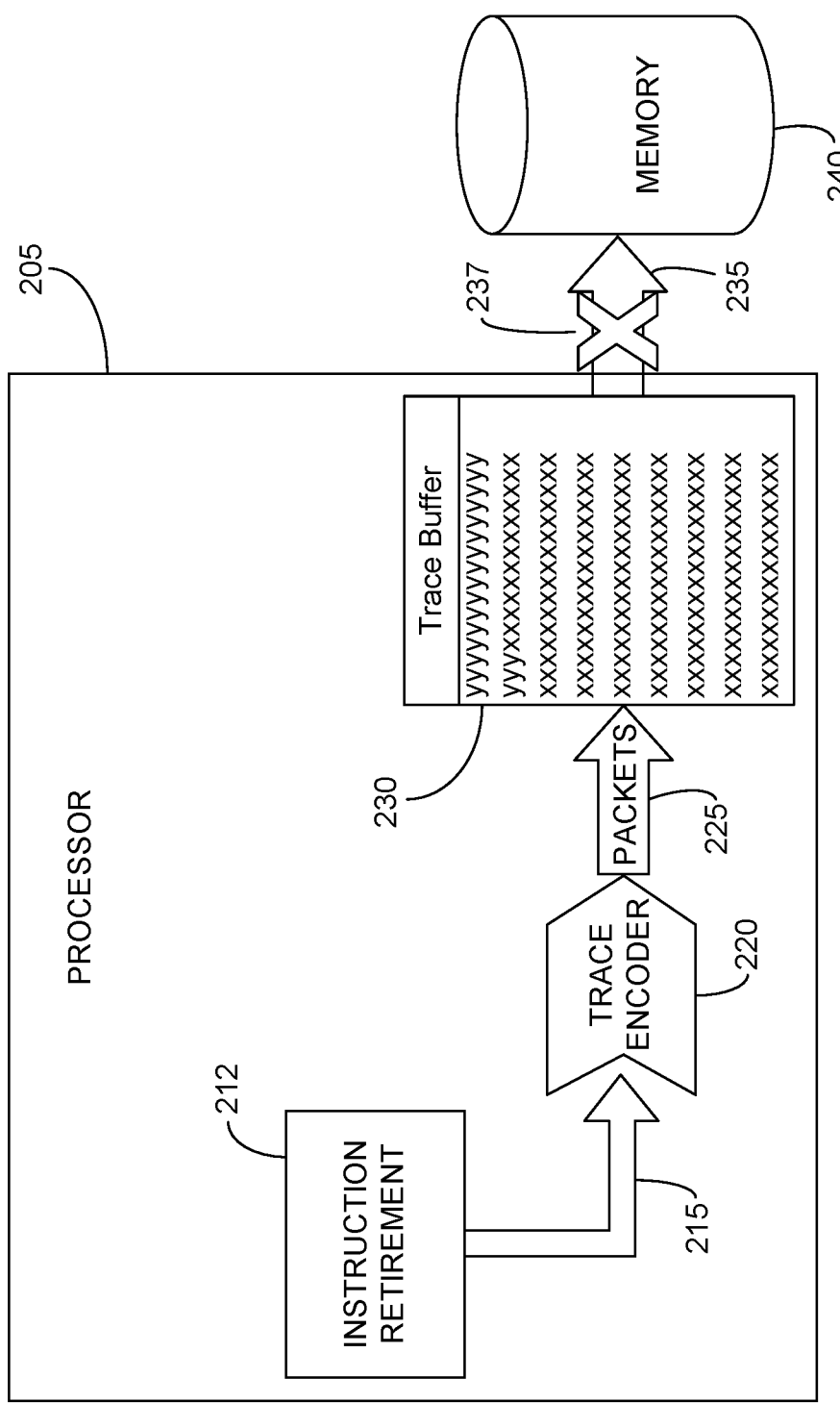
Figure 2C:
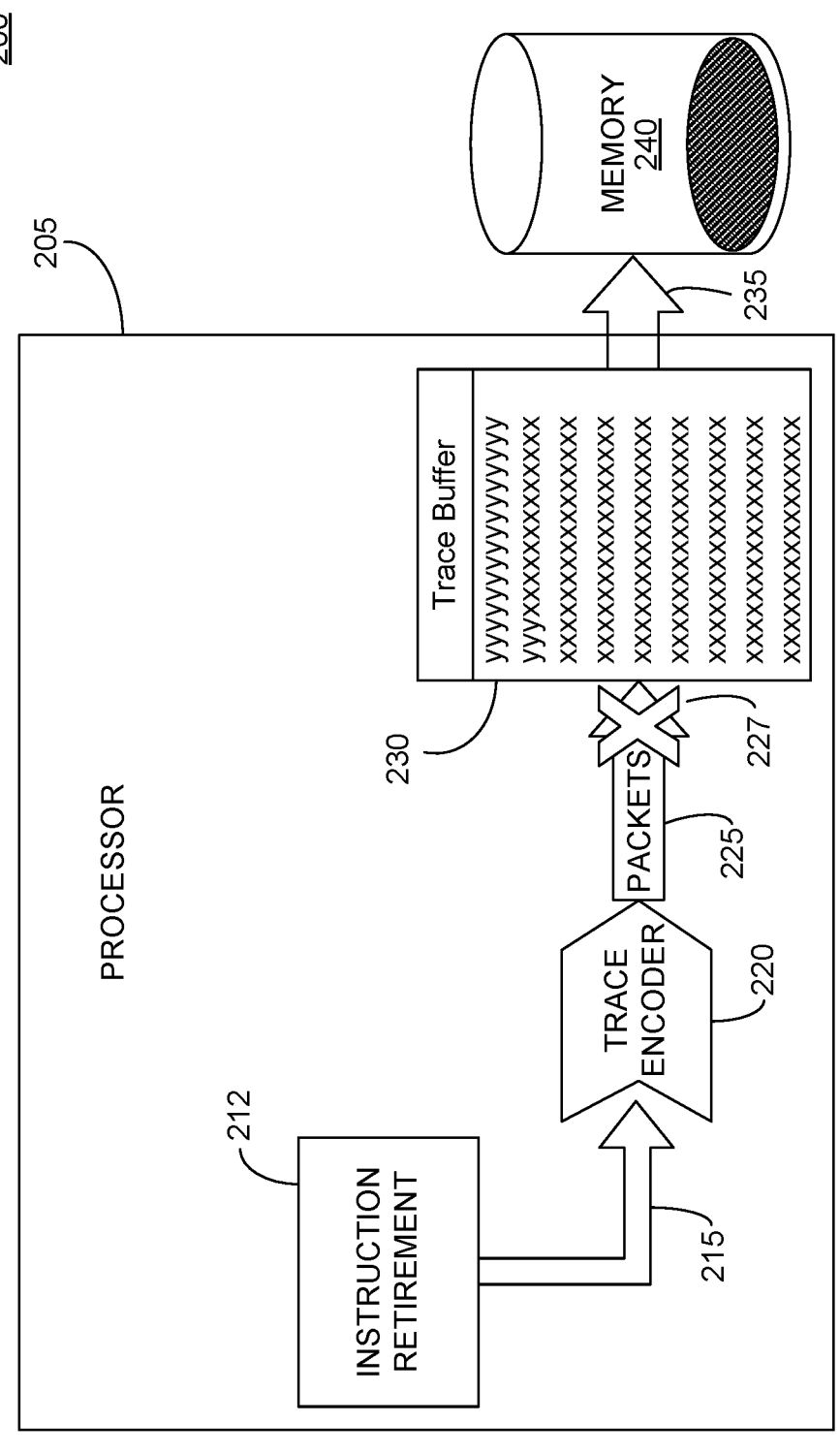

FIG. 2A to 2C are diagrams schematically illustrating operation of a processor 205 in a system 200 implementing an instruction trace flush-on-demand mode of operation. The system 200 in FIGS. 2A to 2C is similar to the system 100 of FIG. 1, though for purposes of clarity, equivalent elements for some elements of the system 100 are not specifically shown in FIGS. 2A to 2C. For instance, equivalents for the interface 145, the decoder 150, and the configuration register 155 are not shown in FIGS. 2A to 2C. Also, in FIGS. 2A to 2C, an equivalent of the instruction retirement unit 112 of FIG. 1 is shown as an instruction retirement unit 212 in FIGS. 2A to 2C, without showing an equivalent of the instruction processing unit 110. Like elements of the system 200 as in the system 100 are referenced in FIGS. 2A to 2C with 200 series reference numbers corresponding with the 100 series reference number of the system 100. For instance, as shown in FIGS. 2A to 2C, the system 200 includes the processor 205, the instruction retirement unit 212, an interface 215, a trace encoder 220, an interface 225, a trace (circular) trace buffer 230, a memory interface 235, and memory 240.

FIG. 2A schematically illustrates enabling collection of instruction trace information in the system 200. For instance, in example implementations, the system 200 can be configured as illustrated in FIG. 2A in response to a request received by the processor 205, e.g., by writing one or more bits of a configuration register, or other appropriate mechanism. In response to the request, the trace encoder 220 (and the interface 225) can be enabled, and the memory interface 235 can be disabled, as indicated by the X 237 in FIG. 2A. The trace encoder 220 can then begin producing encoded and compressed trace information, including sync packets, based on instruction retirement information provided by the instruction retirement unit 212. Encapsulated packets including trace information can then be provided to the trace buffer 230 by the trace encoder 220 via the interface 225. As the trace information is stored in the trace buffer 230, the trace buffer 230 begins to fill, as indicated by the series of lowercase x characters shown in the trace buffer 230. In this example, the series of lowercase x characters denotes instruction trace information stored in a first cycle (pass) through the trace buffer 230 (e.g., where the trace buffer 230 is initially empty, or in an initial state, with no valid trace information being stored).

Referring to FIG. 2B, the system 200 is illustrated in the same configuration as in FIG. 2A, e.g., with the trace encoder 220 enabled and the memory interface 235 disabled, but after the trace buffer 230 has been filled. In addition, as shown in FIG. 2B, writing of instruction trace information has wrapped around from an end (bottom) of the trace buffer 230 to a beginning (top) of the trace buffer 230. As shown in FIG. 2B, a series of lowercase y characters indicates trace information stored in the trace buffer 230 after this wrapping from the end to the beginning of the trace buffer 230, e.g., during a second cycle through the trace buffer 230. As shown in FIG. 2B, the trace information represented by the series of lowercase y characters, after the wrapping to the beginning of the trace buffer 230, overwrites the older trace information represented by the series of lowercase x characters, e.g., from the first cycle through the trace buffer 230. As described herein, the trace information represented in FIGS. 2A and 2B (as x and y characters) can include corresponding sync packets that are periodically communicated from the trace encoder 220 to the trace buffer 230, e.g., at least two per cycle through the trace buffer 230.

Referring to FIG. 2C, the system 200 is illustrated as being configured to flush trace information from the trace buffer 230 to the memory 240, e.g., flush on demand. For instance, in example implementations, the system 200 can be configured as illustrated in FIG. 2C in response to a request received by the processor 205, e.g., by writing one or more bits of a configuration register, or other appropriate mechanism. In response to the request, the trace encoder 220 (and/or the interface 225) can be disabled, as indicated by the X 227 in FIG. 2C, and the memory interface 235 can be enabled. The trace buffer 230, in this configuration, can then begin flushing stored trace information out to the memory 240.

Figures 3, 4:
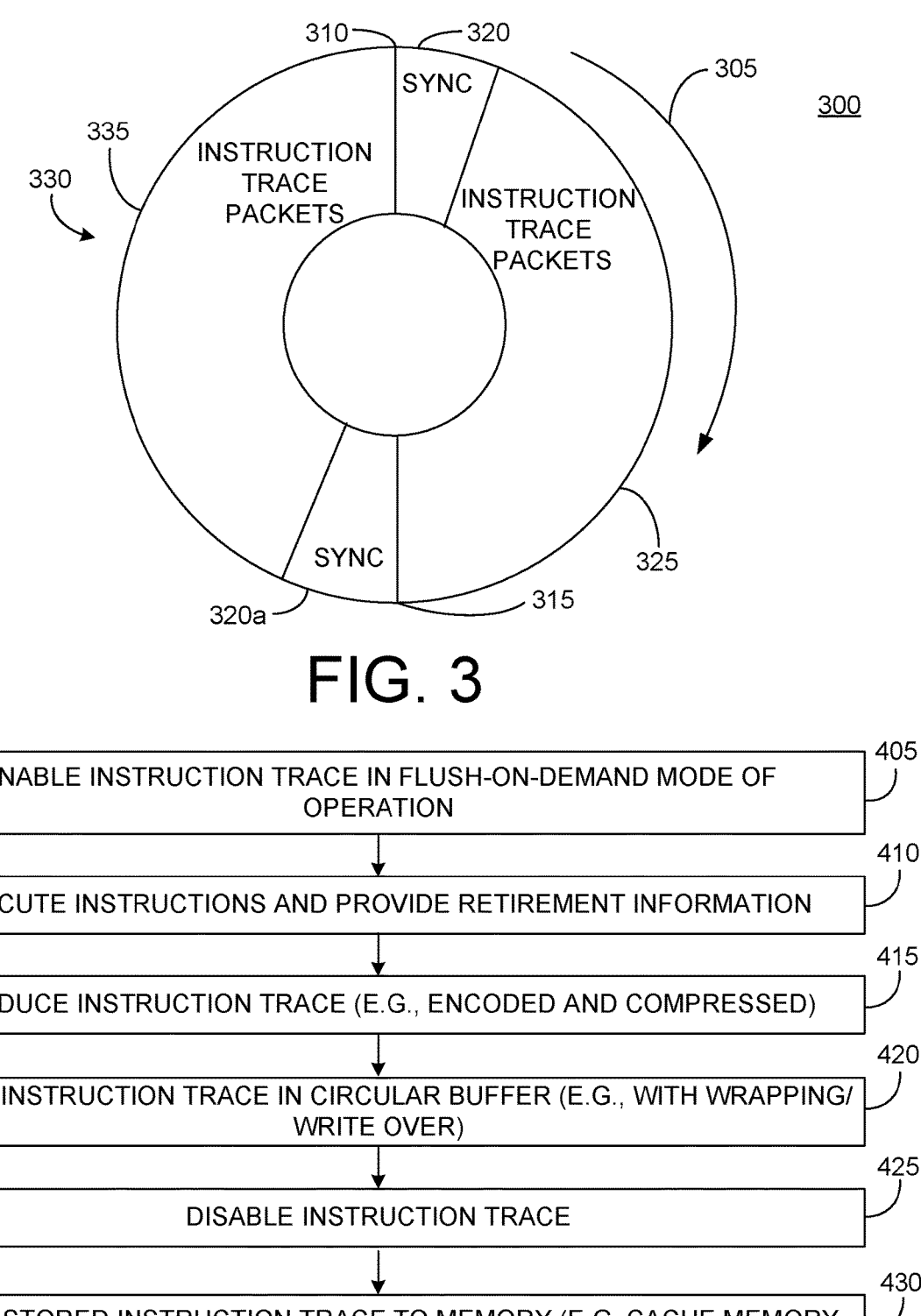
FIG. 3 is a diagram 300 schematically illustrating operation of a circular buffer 330 for implementing flush-on-demand instruction trace.
FIG. 4 is a flowchart illustrating a method for operation of a processor in a flush-on-demand instruction trace mode of operation.

FIG. 3 is a diagram 300 schematically illustrating operation of a circular buffer 330 for implementing flush-on-demand instruction trace. As shown in FIG. 3, the circular buffer 330 can be written in a circular manner, e.g., in a direction 305. In the diagram 300, a boundary 310 is shown, which can be a boundary between a beginning (top) and an end (bottom) of the circular buffer 330, e.g., where wrapping occurs each time the circular buffer 330 fills, or an end of the circular buffer 330 is reached when storing trace information. Also in the diagram 300, a boundary 315, illustrating a mid-point of the circular buffer 330, is illustrated.

In this example, the circular buffer 330 is illustrated after at least one cycle of storing trace information in the circular buffer 330 has completed, e.g., the circular buffer 330 is filled. As shown in example of FIG. 3, a sync packet 320 can be stored at the boundary 310 (top/bottom boundary), and another sync packet 320a can be stored at the boundary 315 (mid-point boundary). Instruction trace packets 325 can be stored after the sync packet 320, but before the sync packet 320a, while instruction trace packets 335 can be stored after the sync packet 320a, but before the sync packet 320. In some implementations, additional sync packets could be used. For instance, three sync packets could be used, which can result in at least two-thirds of the corresponding trace buffer including useful trace information. In other implementations, additional sync packets, e.g., more than three, can be included in a trace buffer storing buffered trace information.

In this example, the portion of the trace information included in the instruction trace packets 325 and the instruction trace packets 335 that is valid and usable will depend on when collection of trace information stopped. That is, what information is valid and usable will depend on the relationship of the instruction trace packets 325 to the sync packet 320, and the relationship of the instruction trace packets 335 to the sync packet 320a. For instance, if collection of trace information is stopped immediately after the sync packet 320 is stored in the circular buffer 330, the instruction trace packets 325 would not be associated with the sync packet 320 (as their sync packet would have been overwritten by the sync packet 320), though the instruction trace packets 335 would be valid. If, however, immediately after the boundary 310 is reached, and before writing another sync packet, both the instruction trace packets 325 and the instruction trace packets 335 would be valid and usable.

In some implementations, a determination of what portions of trace information obtained from a trace buffer (e.g., the circular buffer 330) are valid and usable, or have a valid associated sync packet can be determined by a decoder, such as the decoder 150 of the system 100. In some implementations, the arrangement of sync packets and instruction trace packets in the circular buffer 330 can vary, e.g., may not align with the boundary 310 and the boundary 315, as shown in the example of FIG. 3.

FIG. 4 is a flowchart illustrating a method 400 for operation of a processor in a flush-on-demand instruction trace mode of operation. In some implementations, the method 400 can be implemented utilizing a processor such as the processor 105 in the system 100 of FIG. 1, and/or the processor 205 in the system 200 of FIGS. 2A to 2C. Accordingly, for purposes of illustration, the method 400 is described with further reference to, at least, FIG. 1.

As shown in FIG. 4, at block 405, the method 400 includes enabling instruction trace in a flush-on-demand (FOD) mode of operation. Enabling instruction trace in the FOD mode of operation at block 405 can be performed in response to the processor 105 receiving an enable request, such as by writing one or more corresponding configuration bits in the configuration register 155. The processor 105 can, e.g., in response to writing the one or more configuration bits, at block 405, enable the trace encoder 120, and disable the memory interface 135.

At block 410, the method 400 includes executing instructions and providing instruction retirement information for completed instructions. For instance, the operations at block 410 can include the instruction processing unit 110 of the processor 105 executing a plurality of machine-readable instructions of a program in accordance with a control flow of the program. The operations at block 410 of the method 400 can further include the instruction retirement unit 112 of the instruction processing unit 110 providing instruction retirement information to the trace encoder 120, via the interface 115.

At block 415, the method includes producing an instruction trace, e.g., an encoded and compressed instructions trace, based on the instruction retirement information provided by the instruction retirement unit 112. For example, at block 415, the trace encoder 120 can receive respective instruction retirement information for completed instructions from the instruction retirement unit 112, and encode the respective instruction retirement information in the instruction trace in correspondence with the control flow of the program, such as using the approaches described herein. Encoding of the instruction retirement information in the instruction trace can depend, however, on the particular implementation, and different approaches can be used.

At block 420, the method 400 includes storing the instruction trace, e.g., instruction trace packets, in a circular buffer. As described herein, in example implementations, after a complete cycle through the circular buffer, such that the circular buffer (e.g., the trace buffer 130) is full and an end of the trace buffer 130 has been reached, writing of the instruction trace can wrap to the beginning of the trace buffer 130, thus overwriting earlier stored instruction trace packets (and sync packets).

At block 425, the method 400 includes disabling instruction trace, such as disabling instruction trace in the FOD mode of operation. Disabling instruction trace at block 425 can be performed in response to the processor 105 receiving a disable request, such as by again writing the one or more corresponding configuration bits in the configuration register 155. The processor 105 can then, e.g., in response, disable the trace encoder 120, and enable the memory interface 135 at block 425. As described herein, in some implementations, disabling of the trace encoder 120 and enabling the memory interface 135 (e.g., to flush stored trace information) can be independent of one another.

At block 430, the method 400 includes, in response to the trace encoder 120 being disabled and the memory interface 135 being enabled, communicating the stored instruction trace in the circular buffer to memory via the memory interface. For instance, the operations at block 430 can include instruction trace packets (and corresponding sync packets) stored in the trace buffer 130 being flushed (stored out) to the memory 140, via the enabled memory interface 135. Depending on the particular implementation, the memory 140 can be system memory, cache memory, and/or external memory, such as a USB storage, cloud storage, a network connected device, etc.

As described herein, producing the encoded and compressed instruction trace at block 415 can include periodically communicating sync packets to, and for storage in the circular buffer. In some implementations, such sync packets can include a respective program counter value that indicates a starting executable instruction address for instruction trace (packets) produced subsequent to the synchronization packet being stored in the trace buffer 130. In some implementations, periodically communicating sync packets can include the trace encoder 120 communicating sync packets such that a first sync packet is stored at a beginning of the trace buffer 130, and a second sync packet is stored at mid-point of the trace buffer 130, e.g., when more than half of the trace buffer 130 includes instruction trace information. In other implementations, other approaches for communicating sync packets can be used, such as communicating a sync packet after a predetermined number of retired instructions have been encoded in the instruction trace and communicated to the trace buffer 130, e.g., after a predetermined number of branches, jumps, interrupts and/or exceptions have been encoded in instruction trace packets and communicated to the trace buffer 130.

Figure 5:
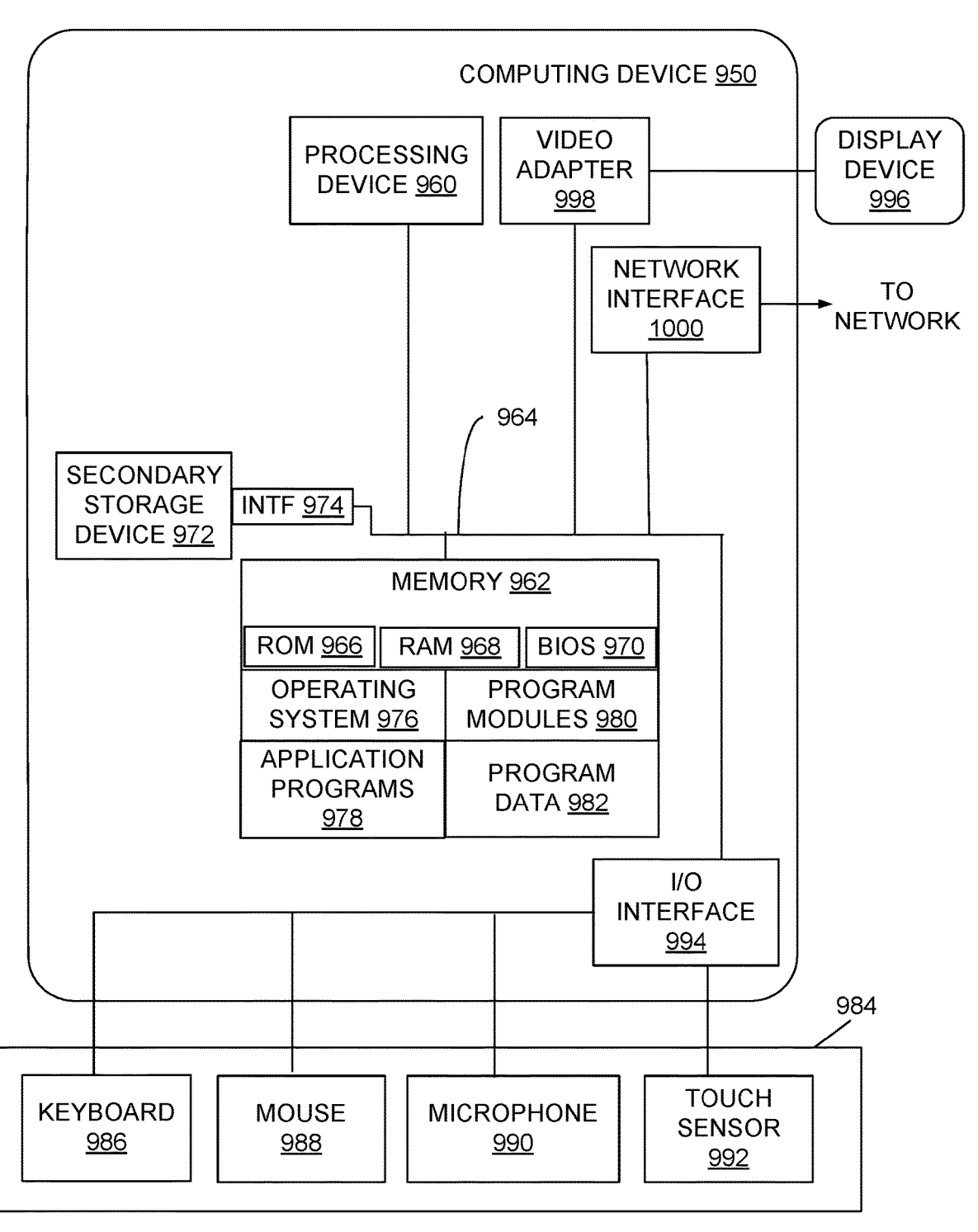
FIG. 5 is a diagram illustrating an example architecture of a computing device, which can be used to implement aspects according to the present disclosure.

FIG. 5 illustrates an example architecture of a computing device 950 that can be used to implement aspects of the present disclosure, including any of the plurality of computing devices described herein, such as a computing device of the system 100 or any other computing devices that may be utilized in the various possible embodiments.

The computing device illustrated in FIG. 5 can be used to execute the operating system, application programs, and software modules described herein.

The computing device 950 includes, in some embodiments, at least one processing device 960, such as a central processing unit (CPU). A variety of processing devices are available from a variety of manufacturers, for example, Intel or Advanced Micro Devices. In this example, the computing device 950 also includes a system memory 962, and a system bus 964 that couples various system components including the system memory 962 to the processing device 960. The system bus 964 is one of any number of types of bus structures including a memory bus, or memory controller; a peripheral bus; and a local bus using any of a variety of bus architectures.

Examples of computing devices suitable for the computing device 950 include a desktop computer, a laptop computer, a tablet computer, a mobile computing device (such as a smart phone, an iPod® or iPad® mobile digital device, or other mobile devices), or other devices configured to process digital instructions.

The system memory 962 includes read only memory 966 and random access memory 968. A basic input/output system 970 containing the basic routines that act to transfer information within computing device 950, such as during start up, is typically stored in the read only memory 966.

The computing device 950 also includes a secondary storage device 972 in some embodiments, such as a hard disk drive, for storing digital data. The secondary storage device 972 is connected to the system bus 964 by a secondary storage interface 974. The secondary storage devices 972 and their associated computer readable media provide non-volatile storage of computer readable instructions (including application programs and program modules), data structures, and other data for the computing device 950.

Although the example environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory computer-readable media. Additionally, such computer readable storage media can include local storage or cloud-based storage.

A number of program modules can be stored in secondary storage device 972 or system memory 962, including an operating system 976, one or more application programs 978, other program modules 980 (such as the software engines described herein), and program data 982. The computing device 950 can utilize any suitable operating system, such as Microsoft Windows™, Google Chrome™ OS or Android, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 950 through one or more input devices 984. Examples of input devices 984 include a keyboard 986, mouse 988, microphone 990, and touch sensor 992 (such as a touchpad or touch sensitive display). Other embodiments include other input devices 984. The input devices are often connected to the processing device 960 through an input/output interface 994 that is coupled to the system bus 964. These input devices 984 can be connected by any number of input/output interfaces, such as a parallel port, serial port, game port, or a universal serial bus. Wireless communication between input devices and the interface 994 is possible as well, and includes infrared, BLUETOOTH® wireless technology, 802.11a/b/g/n, cellular, ultra-wideband (UWB), ZigBee, or other radio frequency communication systems in some possible embodiments.

In this example embodiment, a display device 996, such as a monitor, liquid crystal display device, projector, or touch sensitive display device, is also connected to the system bus 964 via an interface, such as a video adapter 998. In addition to the display device 996, the computing device 950 can include various other peripheral devices (not shown), such as speakers or a printer.

When used in a local area networking environment or a wide area networking environment (such as the Internet), the computing device 950 is typically connected to the network through a network interface 1000, such as an Ethernet interface or WiFi interface. Other possible embodiments use other communication devices. For example, some embodiments of the computing device 950 include a modem for communicating across the network.

The computing device 950 typically includes at least some form of computer readable media. Computer readable media includes any available media that can be accessed by the computing device 950. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 950.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 5 is also an example of programmable electronics, which may include one or more such computing devices, and when multiple computing devices are included, such computing devices can be coupled together with a suitable data communication network so as to collectively perform the various functions, methods, or operations disclosed herein.

What is claimed is:

1. A processor comprising:

an instruction processing unit configured to:

execute a plurality of machine-readable instructions of a program in accordance with a control flow of the program, and produce respective instruction retirement information for each of the plurality of machine-readable instructions;

a trace encoder that is selectively enablable, wherein the trace encoder is configured to:

receive the respective instruction retirement information, and encode the respective instruction retirement information in an encoded instruction trace corresponding with the control flow of the program; and a circular buffer that is configured to:

receive the encoded instruction trace from the trace encoder; and store the encoded instruction trace; and wherein the processor is configured to:

enable the trace encoder;

disable a memory interface while the trace encoder is enabled;

receive a flush request; and enable the memory interface in response to the flush request, wherein the encoded instruction trace stored in the circular buffer is communicated over the memory interface.

2. The processor of claim 1, further comprising a configuration register operatively coupled with at least one of the trace encoder or the memory interface, the configuration register including at least one configuration bit configured to:

selectively enable and disable the trace encoder; and selectively enable and disable the memory interface.

3. The processor of claim 2, wherein the at least one configuration bit includes a configuration bit that can have a first logic value or a second logic value, the processor being configured to:

when the configuration bit has the first logic value, enable the trace encoder and disable the memory interface; and when the configuration bit has the second logic value, disable the trace encoder and enable the memory interface.

4. The processor of claim 2, wherein the at least one configuration bit includes:

a first configuration bit to selectively enable and disable the trace encoder; and a second configuration bit to selectively enable and disable the memory interface.

5. The processor of claim 1, wherein the respective instruction retirement information includes at least one of:

a program counter value;

an indication of an instruction type; or an indication of an instruction result.

6. The processor of claim 1, wherein the trace encoder is configured, when encoding the respective instruction retirement information of the encoded instruction trace, to periodically communicate synchronization packets to, and for storage in, the circular buffer, a synchronization packet of the synchronization packets including a respective program counter value indicating a starting executable instruction address of the encoded instruction trace subsequent to the synchronization packet.

7. The processor of claim 6, wherein periodically communicating synchronization packets includes periodically communicating synchronization packets such that a first synchronization packet is stored at a beginning of the circular buffer, and a second synchronization packet is stored at a mid-point of the circular buffer.

8. The processor of claim 6, wherein periodically communicating synchronization packets includes periodically communicating synchronization packets such that the circular buffer, when filled with information of the encoded instruction trace, includes two or more sync packets.

9. The processor of claim 6, wherein periodically communicating synchronization packets includes periodically communicating synchronization packets based on a number of instruction trace packets provided to the circular buffer by the trace encoder.

10. The processor of claim 6, wherein periodically communicating synchronization packets includes periodically communicating synchronization packets based on a number of instructions encoded in the encoded instruction trace since communication of a previous synchronization packet.

11. The processor of claim 6, wherein a size of the circular buffer is based on a number of instructions to be encoded in the encoded instruction trace after a corresponding synchronization packet.

12. The processor of claim 1, wherein storing the encoded instruction trace includes, when an end of the circular buffer is reached, overwriting previously stored encoded instruction trace starting at a beginning of the circular buffer.

13. The processor of claim 1, wherein encoding the respective instruction retirement information in the encoded instruction trace includes:

encoding:

instruction retirement information for non-sequential machine-readable instructions with respective destinations that cannot be inferred from the program, and instruction retirement information for conditionally non-sequential machine-readable instructions; and excluding encoding instruction retirement information for sequential machine-readable instructions from the encoded instruction trace.

14. The processor of claim 13, wherein encoded instruction information for a conditionally non-sequential instruction includes a single bit indicating whether or a not a branch in the control flow of the program was taken.

15. The processor of claim 1, wherein the memory interface is always disabled while the trace encoder is enabled.

16. A system comprising:

a processor including:

an instruction processing unit configured to:

execute a plurality of machine-readable instructions of a program in accordance with a control flow of the program, and produce respective instruction retirement information for each of the plurality of machine-readable instructions;

a trace encoder that is selectively enablable, wherein the trace encoder is configured to:

receive the respective instruction retirement information, and encode the respective instruction retirement information in an encoded instruction trace corresponding with the control flow of the program; and a circular buffer that is configured to:

receive the encoded instruction trace from the trace encoder; and store the encoded instruction trace;

wherein the processor is configured to:

enable the trace encoder;

disable a memory interface while the trace encoder is enabled;

receive a flush request; and enable the memory interface in response to the flush request, wherein the encoded instruction trace stored in the circular buffer is communicated over the memory interface;

memory operationally coupled with the memory interface, the memory being configured to receive and save the encoded instruction trace received via the memory interface; and a decoder configured to, based on the plurality of machine-readable instructions of the program and the encoded instruction trace received via the memory interface, reconstruct the control flow of the program.

17. The system of claim 16, wherein the circular buffer is implemented using one of:

an array of digital-logic gates;

a cache memory of the processor; or a static-random-access memory of the processor.

18. The system of claim 16, wherein the decoder is implemented on a computing system operationally coupled with the memory to obtain the encoded instruction trace received via the memory interface, the computing system having the plurality of machine-readable instructions of the program stored therein, or having access to the plurality of machine-readable instructions of the program via a communication interface.

19. A method for operating a processor, the method comprising:

receiving, by the processor, a request to enable an instruction trace mode of operation;

in response to receiving the request to enable the instruction trace mode of operation:

disabling a memory interface configured to communicate an instruction trace produced by a trace encoder to memory;

executing, by an instruction processing unit of the processor, a plurality of machine-readable instructions of a program in accordance with a control flow of the program;

producing, by the instruction processing unit for each of the plurality of machine-readable instructions, respective instruction retirement information;

receiving, by the trace encoder, the respective instruction retirement information;

encoding, by the trace encoder, the respective instruction retirement information in the instruction trace in correspondence with the control flow of the program;

sending, by the trace encoder, the instruction trace to a circular buffer of the processor;

storing, by the circular buffer, the instruction trace received from the trace encoder;

receiving, by the processor, a request to flush the instruction trace stored in the circular buffer; and in response to receiving the request to flush the instruction trace stored in the circular buffer:

enabling the memory interface; and communicating the instruction trace stored in the circular buffer from the circular buffer to the memory via the memory interface.

20. The method of claim 19, further comprising, when encoding the instruction trace, periodically communicating synchronization packets to, and for storage in, the circular buffer, a synchronization packet of the synchronization packets including a respective program counter value indicating a starting executable instruction address for instruction trace subsequent to the synchronization packet.

21. The method of claim 20, wherein periodically communicating synchronization packets includes periodically communicating synchronization packets such that a first synchronization packet is stored at a beginning of the circular buffer, and a second synchronization packet is stored at mid-point of the circular buffer.

22. The method of claim 19, wherein encoding the respective instruction retirement information in the instruction trace includes:

encoding, in the instruction trace:

instruction retirement information for non-sequential machine-readable instructions, and instruction retirement information for conditionally non-sequential machine-readable instructions; and excluding encoding instruction retirement information for sequential machine-readable instructions from the instruction trace.

23. The method of claim 22, wherein encoded instruction information for a conditionally non-sequential instruction includes a single bit indicating whether or a not a branch in the control flow of the program was taken.

* * * * *